Figure 1:
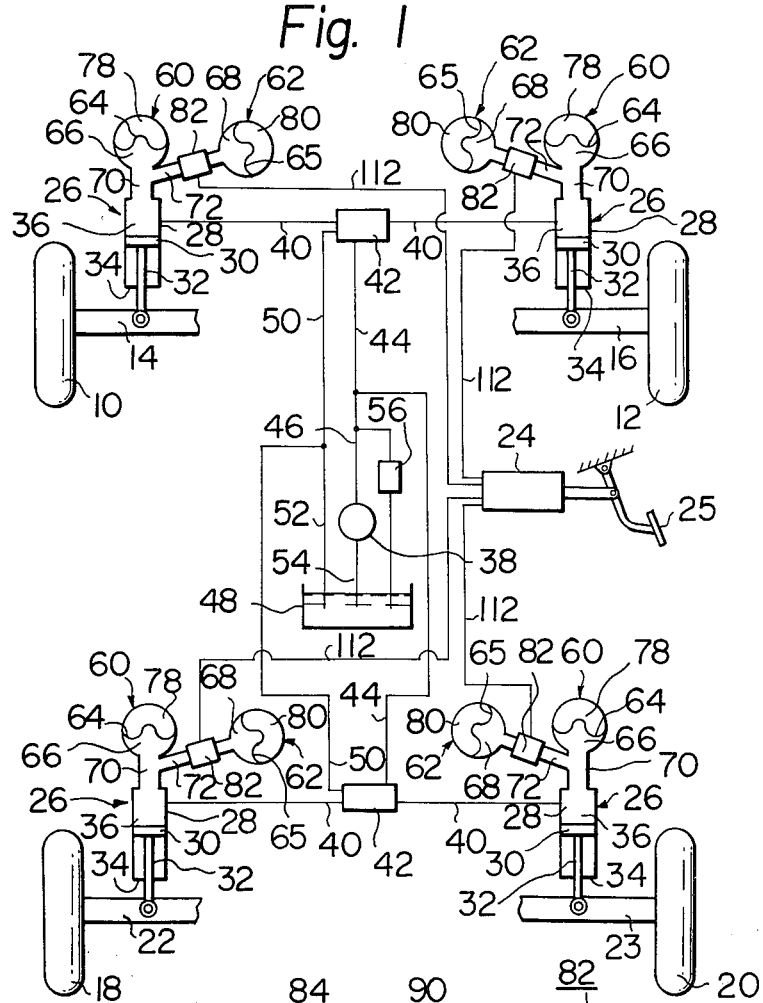

United States Patent [19]

Hiruma

[11] 3,945,664
[45] Mar. 23, 1976

[54] VEHICLE HYDROPNEUMATIC SUSPENSION SYSTEM

[75] Inventor: Mituo Hiruma, Kodaira, Japan

[73] Assignee: Nissan Motor Company Limited, Yokohama, Japan

[22] Filed: May 5, 1975

[21] Appl. No.: 574,257

[30] Foreign Application Priority Data
May 10, 1974 Japan................................ 49-52592

[52] U.S. Cl. ........................... 280/124 F; 267/65 D
[51] Int. Cl.² ......................................... B60G 17/04
[58] Field of Search ................. 280/124 F, 112, 6 H; 267/65 R, 65 D, 64

[56] References Cited
UNITED STATES PATENTS

| | | |
|---|---|---|
| 3,264,008 | 8/1966 | Allinquant........................ 280/124 F |
| 3,606,374 | 9/1971 | Capgras ............................. 280/112 |
| 3,736,000 | 5/1973 | Capgras............................ 280/124 F |

*Primary Examiner*—Philip Goodman

[57] ABSTRACT

A hydropneumatic suspension strut is provided with two pressure accumulators which each cooperate with the fluid chamber of the strut. A valve cuts off cooperation between the fluid chamber and one of the pressure accumulators in response to braking of the vehicle to increase suspension stiffness.

3 Claims, 2 Drawing Figures

VEHICLE HYDROPNEUMATIC SUSPENSION SYSTEM

The present invention relates generally to a hydropneumatic suspension system in a vehicle and particularly to a hydropneumatic suspension system in which the suspension stiffness or flexibility is increased or reduced in response to braking of the vehicle to prevent the vehicle body from undesirably falling forward.

As is well known in the art, a hydropneumatic suspension system can increase the hydraulic fluid volume in a fluid chamber of a suspension strut to elongate same to compensate for compression thereof due to an increase in load and can reduce the hydraulic fluid volume of the fluid chamber to shorten the suspension strut to compensate for elongation thereof due to reduction in load, to maintain the length of the suspension strut substantially constant independently of load.

Such a hydropneumatic suspension strut has a soft suspension flexibility to provide satisfactory or desirable riding comfort or quality for the occupant of the vehicle. Accordingly, when the brakes are applied, the front hydropneumatic suspension struts are compressed to permit the vehicle body to undesirably fall or tilt forward to give the vehicle driver or occupant inconvenience. Furthermore, the hydropneumatic suspension system causes elongation or lengthening of the front hydropneumatic suspension struts in response to compression or shortening of the suspension struts. Thus, when the brakes are released, the front portion of the vehicle body inconveniently lifts and deteriorates the riding stability if the vehicle runs.

It is, therefore, an object of the invention to provide a hydropneumatic suspension system in which the suspension flexibility or stiffness is modified from a normal soft condition to a suitably hard condition to prevent the front portion of the vehicle body undesirably tilting longitudinally in excess of a predetermined limit under braking.

Figure 2:
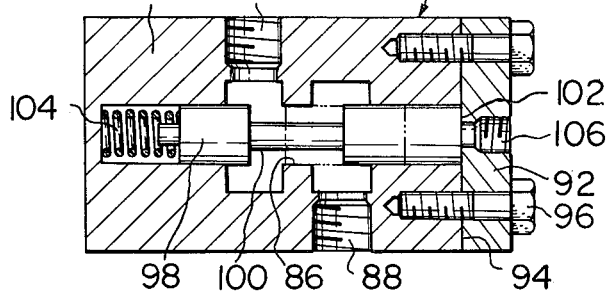

This and other objects and advantages of the invention will become more apparent from the following detailed description taken in connection with the accompanying drawings in which:

FIG. 1 is a schematic view of a preferred embodiment of a hydropneumatic suspension system according to the invention; and FIG. 2 is a schematic cross section view of an example of a control valve forming a part of the hydropneumatic suspension system shown in FIG. 1.

Referring to FIG. 1, there is shown a portion of a vehicle comprising front left and right wheels 10 and 12, front left and right suspension members or axles 14 and 16 connected respectively to the wheels 10 and 12, rear left and right wheels 18 and 20, rear left and right suspension members or axles 22 and 23 connected respectively to the wheels 18 and 20, a master cylinder 24 forming a part of a hydraulic braking system of the vehicle, a brake pedal 25 operatively connected to the master cylinder 24, and a hydropneumatic suspension system according to the invention. The hydropneumatic suspension system is shown to comprise first and second retractable or compressible and extensible hydropneumatic suspension units or struts 26 which are operatively mounted respectively between the body (not shown) of the vehicle and the axles 14 and 16, and similar third and fourth retractable or compressible and extensible hydropneumatic suspension units or struts 26 which are operatively mounted respectively between the vehicle body and the axles 22 and 23.

Each hydropneumatic suspension unit 26 comprises a cylinder 28 which is connected to the vehicle body in a suitable manner. A piston 30 is axially slidably fitted in the cylinder 28 and has a piston rod 32 which extends from the piston 30 outwardly through an end 34 of the cylinder 30 and which is pivotably connected to the corresponding axle in a suitable manner. Alternatively, the cylinder 28 and the piston rod 32 may be connected respectively to the corresponding axle and the vehicle body in a suitable manner. The piston 30 defines in the cylinder 28 together therewith a fluid chamber 36 which is filled with pressurized hydraulic fluid therein and which is variable in volume in response to increases and decreases in a load applied to the corresponding suspension unit 26 or the vehicle body to cause shortening and lengthening of the suspension unit 26.

Each fluid chamber 36 communicates with a pressurized hydraulic fluid source or pump 38 by way of a conduit 40, an automatic level corrector or hydraulic distributor 42, and conduits 44 and 46, and also with a hydraulic fluid reservoir 48 by way of the conduit 40, the level corrector 42, and conduits 50 and 52. The pump 38 draws hydraulic fluid from the reservoir 48 by way of a conduit 54 and pumps pressurized hydraulic fluid into the conduit 46. A pressure relief valve 56 is provided between the conduit 46 and the reservoir 48 and serves to return or permit hydraulic fluid from the pump 38 to the reservoir 48 whenever the pressure of hydraulic fluid in the conduit 46 exceeds a predetermined level and to cease return of hydraulic fluid to the reservoir 48 whenever the pressure of hydraulic fluid in the conduit 46 is at or below the predetermined level.

The level regulator 42 is operable to normally block fluid communication between the conduits 40 and 44 and accordingly between each of the fluid chambers 36 and the pump 38 and between the conduits 40 and 50 and accordingly between each of the fluid chambers 36 and the reservoir 48, and to provide fluid communication between the conduits 40 and 44 to cause feed of pressurized hydraulic fluid into the fluid chambers 36 for lengthening of the suspension units 26 in response to an increase in the load applied to the vehicle body and between the conduits 40 and 50 to cause discharge of hydraulic fluid from the fluid chambers 36 for shortening of the suspension units 26 in response to a reduction in the load applied to the vehicle body so that the height of the vehicle body is maintained substantially constant independently of the load applied thereto.

Each hydropneumatic suspension unit 26 also comprises first and second pressure accumulators or reservoirs 60 and 62 which are divided respectively by flexible partition members or diaphragms 64 and 65 into first chambers 66 and 68 each filled with pressurized hydraulic fluid and communicating with the fluid chamber 36 of the corresponding cylinder 28 by way of passages or conduits 70 and 72 and second chambers 78 and 80 each sealed and containing gas cushions filled with gas under pressure, preferably compressed nitrogen. Each of the gas cushions 78 and 80 is in interacting relationship with the fluid chamber 36 of the corresponding cylinder 28 to permit variations in the volume of the fluid chamber 36.

A control valve 82 is disposed in each passage 72 and serves to normally open the passage 72 to provide fluid communication between the fluid chamber 36 of the corresponding cylinder 28 and the first chamber 68 of the corresponding second accumulator 62 and accordingly permit the interacting relationship between the fluid chamber 36 and the second gas cushion 80, and to close the passage 72 to block fluid communication therebetween and according inhibit the interacting relationship between the fluid chamber 36 and the second gas cushion 80 when the braking of the vehicle occurs.

Each of the gas cushions 78 and 80 is designed to have a predetermined pressure and volume so that the gas cushions 78 and 80 constitute, in cooperation with each other, a single gas cushion having a normal soft suspension flexibility to provide satisfactory riding comfort or quality. However, when the control valve 82 closes the passage 72 as a result of the brakes being applied, the gas cushion 78 singly provides a hard suspension flexibility to prevent the front portion of the vehicle body tilting longitudinally in excess of a predetermined limit.

Referring to FIG. 2, the control valve 82 is shown to comprise a valve body or housing 84 which is formed therein with a valve chamber or bore 86 having a blind and an open end, and first and second ports 88 and 90 each opening into the valve chamber 86. The first port 88 is connected to the fluid chamber 36 of the corresponding cylinder 28 by way of the passages 70 and 72, while the second port 90 is connected to the first chamber 68 of the corresponding second accumulator 62 by way of the passage 72. An end plate or cap 92 is firmly attached to an end 94 of the valve body 84 by suitable fastening means such as bolts 96 to close the open end of the valve chamber 86.

A valve spool 98 is axially slidably fitted in the valve chamber 86 and is formed therein with an annular groove 100. The annular groove 100 provides fluid communication between the first and second ports 88 and 90 when the valve spool 98 is held in a dormant position shown by the solid line in FIG. 2 in which an end 102 of the valve spool 98 abuts against the end plate 92. A compression spring 104 is disposed in the valve chamber 86 at a location between the blind end thereof and the valve spool 98 to urge it into the dormant position. The end plate 92 is formed therethrough with a third port 106 which opens into the valve chamber 86 and which is connected to the master cylinder 24 by way of a conduit 112 to supply hydraulic fluid pressure to the port 106 when the brake pedal 25 is depressed to apply hydraulic fluid braking pressure from the master cylinder 24 to wheel cylinders (not shown) of the vehicle. The fluid pressure supplied from the master cylinder 24 into the port 106 exerts a hydraulic thrust in opposition to the action of the spring 104 on the end 102 of the valve spool 98 and moves it from the dormant position into an operative position shown by the phantom lines in FIG. 2 in which the valve spool 98 cuts off fluid communication between the first and second ports 88 and 90.

The hydropneumatic suspension system thus far described is operated as follows:

When the vehicle is running with the brake pedal 25 not depressed, no hydraulic fluid pressure is supplied into the port 106 of the control valve 82. Accordingly, the valve spool 98 of the control valve 82 is held by the force of the spring 104 in the dormant position shown in FIG. 2 to provide fluid communication between the fluid chamber 36 of the cylinder 28 and the first chamber 68 of the second accumulator 62. Thus, the pressure of hydraulic fluid in the fluid chamber 36 acts on both the gas cushions 78 and 80 of the first and second accumulators 60 and 62 so that the gas cushions 78 and 80 constitute one gas cushion having a normal soft suspension flexibility in cooperation with each other to provide satisfactory riding comfort to the driver or occupant (not shown) of the vehicle.

When the brake pedal 25 is depressed to subject the vehicle to braking deceleration during running of the vehicle, hydraulic fluid pressure is supplied from the master cylinder 24 into the ports 106 of the control valves 82 to exert a hydraulic thrust on the ends 102 of the valve spools 98. As a result, the valve spools 98 are moved by the hydraulic thrust from the dormant position into the operative position shown by the phantom lines in FIG. 2 to block fluid communication between the fluid chambers 36 of the corresponding cylinders 28 and the first chambers 68 of the corresponding second accumulators 62. As a result, the pressure of hydraulic fluid in the fluid chambers 36 acts on only the gas cushion 78 of the corresponding first accumulators 60 so that the gas cushions 78 singly provide a hard suspension. Thus, the first and second suspension units 26 prevent the front portion of the vehicle body from tilting longitudinally in excess of a predetermined value, while the third and fourth suspension struts 26 prevent the rear portions of the vehicle body from falling in excess of a predetermined value due to resistance of the first and second suspension struts 26 to tilting of the front portion of the vehicle body.

It will be appreciated that a hydropneumatic suspension system according to the invention comprises two air cushions which are in interacting relationship with a variable volume fluid chamber of a hydropneumatic suspenion strut, and a control valve which is disposed between the fluid chamber and one of the air cushions and which is operable to normally permit the interacting relationship therebetween and to inhibit the interacting relationship therebetween in response to braking of the vehicle so that both the air cushions provide a normal satisfactory soft suspension flexibility or stiffness during normal operations of the vehicle with the brakes not applied and the other air cushion singly provides a hard suspension flexibility or stiffness to minimize forward inclination of the vehicle body to ensure the safety of the vehicle for a vehicle occupant upon braking of the vehicle.

Although the invention has been described such that a hydropneumatic suspension system comprises a level corrector 42 which is common to two suspension units 26, the invention can be applied to a hydropneumatic suspension system which comprises a level corrector for the exclusive use of each hydropneumatic suspension unit 26.

What is claimed is:

1. A suspension system in a vehicle, comprising a retractable and extensible suspension strut having a fluid chamber therein, said fluid chamber being filled with pressurized hydraulic fluid and being variable in volume in response to increases and decreases in a load applied to said suspension strut to cause shortening and lengthening thereof, first and second pressure accumulators each of which is in interacting relationship with said fluid chamber to permit variations in the volume of said fluid chamber, and control means disposed between said fluid chamber and said second pressure accumulator, said control means normally permitting said interacting relationship between said fluid chamber and said second pressure accumulator and inhibiting said interacting relationship therebetween in response to braking of the vehicle.

2. A suspension system in a vehicle, comprising first and second retractable and extensible suspension struts cooperating respectively with left and right wheels of the vehicle, each of said suspension struts having a fluid chamber which is filled with pressurized hydraulic fluid and which is variable in volume in response to increases and decreases in a load applied to the corresponding suspension strut to cause shortening and lengthening thereof, and first and second pressure accumulators each of which is in interacting relationship with said fluid chamber of the corresponding suspension strut to permit variations in the volume of said fluid chamber, and control means disposed between said fluid chamber of each of said suspension struts and each of the corresponding second pressure accumulators, said control means normally permitting said interacting relationship between the corresponding fluid chamber and second pressure accumulator and inhibiting said interacting relationship therebetween in response to braking of the vehicle.

3. A suspension system as claimed in claim 2, in which said control means comprises a control valve having a valve body formed therein with first, second and third ports and a valve chamber, a valve spool slidably fitted in said valve chamber and formed therein with an annular groove, and biasing means urging said valve spool to a dormant position, said annular groove providing fluid communication between said first and second ports when said valve spool is held in said dormant position, said first port communicating with said fluid chamber of the corresponding suspension strut, said second port communicating with the corresponding second pressure accumulator, said third port communicating with a master cylinder of a braking system of the vehicle for supply of hydraulic fluid pressure thereto to exert on said valve spool a hydraulic force moving it from said dormant position into an operative position to block fluid communication between said first and second ports.

* * * * *